(12) United States Patent
Paukshto et al.

(10) Patent No.: US 7,317,499 B2
(45) Date of Patent: *Jan. 8, 2008

(54) MULTILAYER PLATE AND DISPLAY PANEL WITH ANISOTROPIC CRYSTAL FILM AND CONDUCTING PROTECTIVE LAYER

(75) Inventors: Michael V. Paukshto, Foster City, CA (US); Pavel I. Lazarev, Belmont, CA (US)

(73) Assignee: Nitto Denko Corporation, Osaka (JP)

( * ) Notice: Subject to any disclaimer, the term of this patent is extended or adjusted under 35 U.S.C. 154(b) by 334 days.

This patent is subject to a terminal disclaimer.

(21) Appl. No.: 10/407,450

(22) Filed: Apr. 4, 2003

(65) Prior Publication Data

US 2004/0036817 A1 Feb. 26, 2004

Related U.S. Application Data

(60) Provisional application No. 60/405,581, filed on Aug. 22, 2002.

(51) Int. Cl.
G02F 1/1335 (2006.01)
(52) U.S. Cl. .......................... 349/96; 349/104; 349/122
(58) Field of Classification Search ................. 349/96, 349/104, 122
See application file for complete search history.

(56) References Cited

U.S. PATENT DOCUMENTS

| | | | | |
|---|---|---|---|---|
| 3,994,567 | A * | 11/1976 | Matsuo et al. | 349/132 |
| 4,196,973 | A * | 4/1980 | Hochstrate | 349/68 |
| 5,148,298 | A * | 9/1992 | Shigeta et al. | 349/25 |
| 5,189,537 | A * | 2/1993 | O'Farrell | 349/195 |
| 5,281,562 | A | 1/1994 | Araujo et al. | |
| 5,293,546 | A | 3/1994 | Tadros et al. | |
| 5,323,252 | A * | 6/1994 | Yoshida et al. | 349/148 |
| 5,340,504 | A | 8/1994 | Claussen | |
| 5,358,739 | A | 10/1994 | Baney et al. | |
| 5,539,552 | A * | 7/1996 | Desai et al. | 349/104 |

(Continued)

FOREIGN PATENT DOCUMENTS

EP   1 004 921 A1   5/2000

(Continued)

OTHER PUBLICATIONS

Ignatov, L.Y., et al., "Thin Crystal Film polarizers and retarders", Liquid Crystal Materials, Devices, and Applications VIII, *Proceedings of SPIE*, Jan. 21-22, 2002, vol. 4658, pp. 79-89.

(Continued)

*Primary Examiner*—Andrew Schechter
(74) *Attorney, Agent, or Firm*—Westerman, Hattori, Daniels & Adrian, LLP.

(57) ABSTRACT

A multilayer plate is provided comprising an optically transparent substrate, a protective layer, a conducting layer, and at least one anisotropic thin crystal film. The anisotropic thin crystal film is made of a substance containing aromatic rings and possessing a structure with an interplanar spacing of 3.4±0.2 Å along one of optical axes. The thin crystal film is situated between the substrate and the conducting layer and is separated from the conducting layer by the protective layer. The transmission of the multilayer plate for UV radiation does not exceed 1% at any wavelength below 380 nm.

104 Claims, 3 Drawing Sheets

U.S. PATENT DOCUMENTS

| | | | | |
|---|---|---|---|---|
| 5,977,002 | A | * | 11/1999 | Boulos et al. ............... 501/71 |
| 5,999,243 | A | * | 12/1999 | Kameyama et al. ......... 349/185 |
| 6,124,907 | A | * | 9/2000 | Jones et al. .................. 349/96 |
| 6,252,032 | B1 | * | 6/2001 | Van Antwerp et al. ....... 528/73 |
| 6,767,594 | B1 | * | 7/2004 | Miroshin et al. .......... 428/1.31 |
| 2002/0105608 | A1 | | 8/2002 | Lazarev |
| 2004/0070704 | A1 | * | 4/2004 | Lazarev et al. ............... 349/96 |

FOREIGN PATENT DOCUMENTS

| | | |
|---|---|---|
| EP | 1 128 192 A1 | 8/2001 |
| JP | 59145255 A2 | 8/1984 |
| JP | 01276120 | 6/1989 |
| JP | 10206905 | 7/1998 |
| JP | 10-206905 | 8/1998 |
| WO | WO 94/28073 | 12/1994 |
| WO | WO 03/29883 A1 | 4/2003 |

OTHER PUBLICATIONS

Lazarev, P., et al., "E-type Polarizers and Retarders", The SPIE's 47$^{th}$ Annual Meeting, The International Symposium on Optical Science and Technology, Paper No. 4819-07. 'Online! Jul. 7-11, 2002, XP002261227, Seattle, WA, <url:http://www.optivainc.com/Publications/A-Conference_Proceedings/A-01.pdf>.

G. Franklin et al., "Evaluation of Liquid Crystal Thin Film Polarizers Coated on the Inside and the Outside of LCD's", Proceedings of the 3$^{rd}$-iccg, pp. 641-644.

S.T. Wu, D.K. Yang, "Reflective Liquid Crystal Displays", 2001, by John Willey and Sons Ltd (book), (table of contents only).

Pochi Yeh, Claire Gu, "Optics of Liquid Crystal Displays", 2001, by John Willey and Sons Ltd (book), (table of contents only).

M.M. Zwick, "Poly (vinyl Alcohol)- Iodine Complexes", Journal of Applied Polymer Science, Spinning Research Development, Cnntral Laboratory TNO, Delft, The Netherlands, vol. 9, (1965), pp. 2393-2424.

* cited by examiner

MULTILAYER PLATE AND DISPLAY PANEL WITH ANISOTROPIC CRYSTAL FILM AND CONDUCTING PROTECTIVE LAYER

RELATED APPLICATION

This application claims priority to the U.S. Provisional Patent Application No. 60/405,581 filed Aug. 22, 2002, the entire disclosure of which is hereby incorporated by reference.

FIELD OF THE INVENTION

This invention relates generally to devices for data display, and in particular to elements of liquid crystal display panels.

BACKGROUND OF THE INVENTION

Traditionally, a liquid crystal display (LCD) represents a flat cell comprising two plane-parallel base plates and a system of electrodes. The electrodes are made of an optically transparent, conducting material, for example, a solid solution of indium and tin oxides (ITO), $In_2O_3$ and $SnO_2$, and formed on the inner surfaces of the plates. The surface of the plate with electrodes is usually coated with a layer of polyimide or some other polymer and subject to a special treatment ensuring required homogeneous alignment of the molecules of a liquid crystal at the surface and in the bulk of a liquid crystal layer formed in the cell. After assembly, the cell is filled with a liquid crystal (LC), which forms a 5 to 20 μm thick layer functioning as an active medium, the optical properties of which change under the action of an applied electric field. The change in the optical properties is registered by a system of crossed polarizers usually glued onto the external surface of the cell. See Yeh, Pochi, and Gu, Claire, Optics of liquid crystal displays, N.Y. 1999.

Commercial LCD panels are fabricated using plates comprising a plane-parallel glass substrate and a conducting layer. The glass plate must be highly planar and free of bubbles and other optical defects. Depending on the future operation conditions, the blank plates are provided with different conducting layers. For displays operating in the transmission mode, the conducting layers are made transparent. For displays operating in the reflection mode, the front plate is made of a transparent conducting layer, and the back plate is made of a reflecting conducting layer. See Wu, Shin-Tson, and Yang, Deng-Ke, Reflective Liquid Crystal Displays, N.Y., 2001. Transparent conducting layers typically possess a surface resistivity in the range from 10 to $10^2$ Ohm and a transmission coefficient of 0.7 to 0.9 in the visible spectral range. The conducting layers are fabricated by various deposition techniques.

Generally, an LCD panel bears an array of LCDs, with a necessary electrode configuration for each LCD fabricated by methods of mask etching. The electrodes terminate at the glass plate edges by contact areas suited for soldering external connectors. Individual LCDs on the panel are separated by etched paths, at which the desired LCD panel configuration will be glued. The necessary gap between plates is provided by spacers disposed at the perimeter of the assembly. An LCD panel (or array) is filled with an LC solution in vacuum. During this process, the plates are heated in order to decrease the LC viscosity and provide better filling of the gap. Then, individual LCDs formed in the array are separated by scribing and breaking, and each LCD cell is hermetically sealed. Finally, polarizers are glued onto the external LCD surfaces. The polarizers either bear a protective layer or are protected by additional glass plates.

In order to prevent diffusion of ions from glass to LC in the course of display operation, a special protective layer is formed between the glass plate and the conducting film. Generally, this protective layer is composed of silicon dioxide or a heavy metal oxide, although polymer films can also be used. The protective layer must be transparent in the working spectral range, while the layer thickness and density must provide for reliable isolation of LC from glass.

There are various methods for depositing protective layers, including physical techniques based on evaporating or sputtering materials, and chemical methods employing chemical reactions. See Proceedings of the $3^{rd}$ International Conference on Coatings on Glass, Oct. 29-Nov. 2, 2000, Maastricht, the Netherlands. At present, most widely used technologies employ the method of vacuum deposition. This technique is based on the thermal evaporation of a given material under high vacuum conditions. The vapor condenses to form a thin layer on a substrate surface. The process is quite rapid, taking from a few seconds to several minutes.

Another physical deposition technique is based on cathode sputtering. This process employs atoms sputtered from a cathode bombarded with high-energy ions of a rarefied gas. The sputtered atoms are deposited onto a substrate surface. In the case of reactive sputtering, a chemically active gas (for example, oxygen) is introduced to the working chamber, which favors the formation of deposits with a required chemical composition.

Chemical deposition methods include, for example, the formation of films from solutions of hydrolyzed compounds. According to this, a silicon dioxide film can be obtained by sedimentation from a silicon ethylate solution onto a substrate rotating in a centrifuge.

U.S. Pat. No. 5,358,739 describes a method for the formation of a silicon dioxide film by applying a layer of silazane polymer onto a substrate, followed by heating in an oxidizing medium. There are many other methods for the formation of protective coatings.

Traditional polarizers for LCDs represent polymer films made of PVA or its derivatives oriented by uniaxial stretching, bulk stained with iodine compounds. See M. M. Zwick, J. Appl. Polym. Sci., No. 9, 2393-2424 (1995). The iodine-stained PVA-based polarizers possess high polarization characteristics in the longwave region of the visible spectral range and are highly stable in light. Disadvantages of the iodine-containing polarizers are low moisture resistance and thermal stability, which require using various protective layers. Such polarizers may contain up to ten layers.

An alternative to the iodine-containing polarizers is offered by the films containing dichroic dyes. See U.S. Pat. No. 5,340,504 and JP 59,145,255. Such polarizing films are obtained by uniaxially stretching a polymer (for example, PVA) film bulk-stained with a dichroic dye. However, use of the polarizers stained with dichroic dyes also requires applying protective layers.

The optical axis of polarizers obtained by uniaxial stretching is directed along one of the film sides. However, some designs of LCDs of the TN and STN types require that the polarization axis make a nonzero angle with the LCD sides. Cutting such polarizers leads to a considerable (up to 20%) amount of wastes.

Polarizers are glued onto an LCD cell after assembly, which introduces additional, technological operations and increases the cost of final products.

WO 94/28073 describes a polarizer based on a liquid-crystalline solution of organic dyes. According to this technology, the polarizer is obtained by depositing a thin layer of the liquid-crystalline dye solution onto a glass or polymer substrate by one of the known methods. A special feature of this technology is that the orientation of the dye molecules is effected in the course of deposition, so that a thin thermally stable polarizing film is obtained immediately upon drying. Using such polarizers allows new types of LCDs to be developed, in which the polarizing layers can be formed immediately on the walls (either external or internal) of the LC cell. The internal layers are preferred, since this design increases the strength and reliability of LCDs, simplifies the LCD design, and reduces the number of technological operations.

By properly selecting the application and alignment conditions, it is possible to obtain a dichroic polarizer containing anisotropic film possessing, at least partly, a crystalline structure. See EP 01128192 A1. Such dichroic polarizers are characterized by a higher degree of anisotropy and better thermal stability.

In LCDs with internal polarizers, a dichroic polarizing layer is usually formed above the electrode system according to EP 01004921 A1. For this purpose, the electrodes are covered with a special layer ensuring leveling (planarization) and improving adhesion of the dichroic polarizer material. However, this increases the number of layers, the total LCD thickness, and the number of technological operations. Moreover, application of a dichroic polarizer after the formation of electrode system makes the production scheme less flexible, thus hindering changes in the assortment of products.

Another problem in the production of LCDs is their protection from UV radiation. As is known, liquid crystals employed in modern LCDs degrade after 20 to 25 hours upon exposure to the UV radiation. This necessitates the use of additional protective layers or special materials in the LCD design. See U.S. Pat. No. 5,539,552. For example, U.S. Pat. No. 5,281,562 describes special glasses possessing a sharp cutoff at about 400 nm used as materials for the base plates.

SUMMARY OF THE INVENTION

The present invention provides a multilayer plate comprising an optically transparent substrate, a protective layer, a conducting layer, and at least one anisotropic thin crystal film. The anisotropic thin crystal film is made of a substance containing aromatic rings and possessing a structure with an interplanar spacing of 3.4±0.2 Å along one of optical axes. The crystal film is situated between the substrate and the conducting layer and is separated from the conducting layer by the protective layer. The transmission of the multilayer plate for UV radiation does not exceed 1% at any wavelength below 380 nm.

The present invention provides a display panel comprising an optically transparent substrate, a protective layer, a system of electrodes, and at least one anisotropic thin crystal film. The thin crystal film is made of a substance containing aromatic rings and possessing a structure with an interplanar spacing of 3.4±0.2 Å along one of optical axes. The at least one thin crystal film is situated between the substrate and the conducting layer and is separated from the conducting layer by the protective layer. The transmission of the multilayer plate for UV radiation does not exceed 1% at any wavelength below 380 nm.

BRIEF DESCRIPTION OF THE DRAWINGS

The present invention will be more clearly understood upon reading the following detail description and claims accompanied by the drawings, in which:

Figure 1:
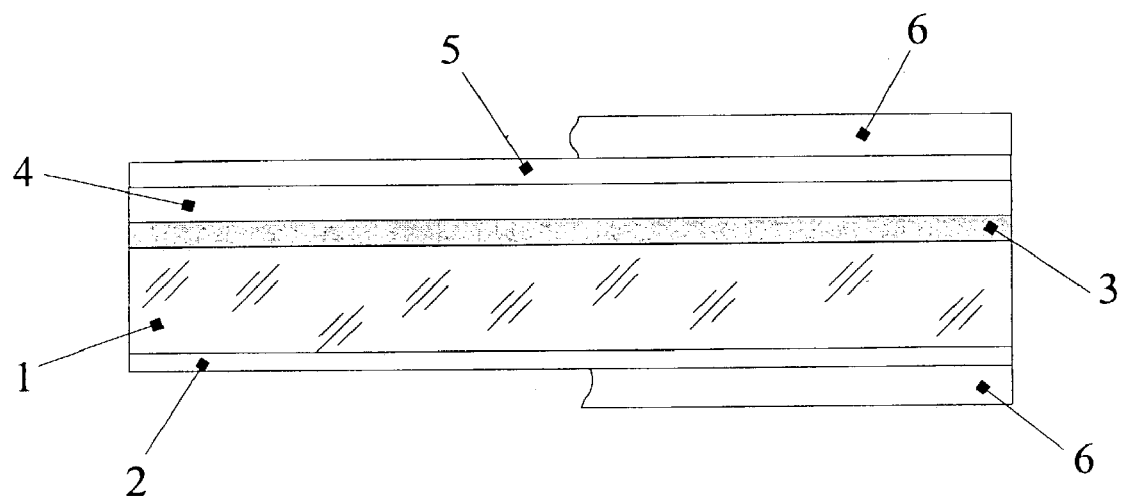
FIG. 1 is a schematic of the transparent multilayer plate in accordance with one embodiment of the invention.

DETAIL DESCRIPTION OF THE INVENTION,

The present invention is aimed at the creation of a multilayer plate which can be used in the production of liquid crystal displays (LCDs), and in particular of thin transmissive or reflective or transflective LCDs with internal polarizers.

The technical result of the present invention is an increase in the reliability and a decrease in the thickness of LCDs, as well as in the number of operations involved in the LCD assembling process.

This technical result is achieved by using a multilayer plate containing a substrate, a protective layer, a conducting layer, and at least one layer of an anisotropic thin crystal film. The thin crystal film represents a substance containing aromatic rings and possesses an interplanar spacing (Bragg's reflection) of 3.4±0.2 Å along one of the optical axes. At least one layer of the thin crystal film is confined between the substrate and the conducting layer, and separated from the conducting layer by a special protective layer. The thin crystal film substance may also contain heterocycles.

For the transmissive or transflective multilayer panel, the substrate is made of the optically transparent material, for example glass or plastic. In this design, the optically transparent substrate can be manufactured with UV additives which make the substrate absorbing the UV radiation. In another embodiment, an additional layer is provided to protect against the UV radiation.

For the reflective multilayer plate, the reflector itself can serve as a substrate.

The protective layer can be made of silicon dioxide and/or heavy metal oxides and/or polymers. The material should be protective enough during the etching procedure, and at the same time it should have good adhesion to the conductive material used. The protective layer can be a multilayer structure comprising silicon dioxide as a material which has a good adhesion to the ITO usually used as a conductive layer; and under the silicon dioxide there is usually a separate protective layer which is used as a protective layer during the etching of the conductive layer. The protective layer in this case is usually made of polyurethane or acrylate.

In some cases, the conductivity of the ITO layer can be increased by depositing a metal grid (for example, by mask deposition techniques). The total area of the metal grid must not exceed 10% of the total area of the multilayer plate.

The thin crystal film usually represents a polarizer of the E type. In some cases, the thin crystal film can simultaneously perform the functions of polarizer and phase-shifting layer.

In some cases, at least a part of the protective layer can be conducting (for example, by surface doping).

The reflective and transflective multilayer panels comprise a reflector that can be a specular or diffusive mirror and made of, for example Al, Ag or Au.

In order to prevent damage during transportation, it is recommended that the multilayer plate be covered by additional protective polymer films.

In addition, the above claimed technical result is achieved by using a transmissive LCD panel containing an optically transparent substrate, a protective layer, a system of electrodes, and at least one layer of an anisotropic thin crystal film. The thin crystal film is composed of a substance containing aromatic rings and possesses an interplanar spacing (Bragg's reflection) of 3.4±0.2 Å along one of the optical axes. At least one layer of the thin crystal film is confined between the substrate and the electrode system, and separated from the conducting layer by a special protective layer. The thin crystal film substance may also contain heterocycles.

The conductivity of the conductive, in particular ITO layer can be increased by depositing a metal grid (for example, by mask deposition techniques). The total area of the metal grid should not exceed 10% of the total area of the multilayer plate.

The LCD panel may contain additional adhesive layers.

The reflective or transflective LCD panel may comprise one transmissive multilayer plate and one reflective or transflective multilayer plate. At least one of the plates should be designed with the use of at least one anisotropic thin crystal film. In one embodiment, the transmissive multilayer plate comprises the thin crystal film, and the reflective or transflective multilayer plate comprises a conventional polarizer. In another embodiment, the transmissive multilayer film comprises the conventional polarizer, and the reflective of transflective plate comprises the anisotropic thin crystal film. In a further embodiment, each plate—transmissive and reflective or transflective comprises at least one thin crystal film in its design.

A multilayer plate according to the invention comprises the following layers: (i) a substrate, which is optically transparent for the transmissive design and is usually made of a soda-lime glass; (ii) an optically anisotropic thin crystal film layer representing a substance containing aromatic rings and possessing an interplanar spacing (Bragg's reflection) of 3.4±0.2 Å along one of the optical axes; (iii) a protective layer, for example, of polyurethane or acrylate with a silicon dioxide as an intermediate layer; (iv) a conducting layer, such as ITO; and (v) an additional UV-cutoff layer transparent in the visible range, which can be applied between any of the above layers. The role of the UV-cutoff filter can be performed by the optically transparent substrate, in which case the additional layer can be absent. It is necessary to ensure that the transmission of the multilayer plate for the UV radiation does not exceed 1% at any wavelength below 380 nm, while being not less than 80% in the visible spectral range.

In the reflective or transflective multilayer plate designs, the UV cutoff filter is optional. The transflective design has a different location of the UV cutoff filter—in this case it should be under the glass—on the side of the backlight.

The optically anisotropic layer performs the function of polarizer or simultaneously performs the functions of polarizer and phase-shifting layer. Preferably this layer is at least partly crystalline, which will ensure a high stability of the structure and the required optical parameters. Selection of the base material for this layer is determined by the presence of a developed system of π-conjugated bonds in aromatic rings and by the presence of groups (such as amine, phenol, ketone, etc.) lying in the plane of the molecule and entering into the aromatic system of bonds. The molecules and/or the molecular fragments possess a planar structure. These can be, for example, organic substances such as indanthrone (Vat Blue 4), 1,4,5,8-naphthalinetetracarboxylic acid dibenzoimidazole (Vat Red 14), 3,4,9,10-perylenetetracarboxylic acid dibenzoimidazole, or quinacridone (Pigment Violet 19), etc., the derivatives of which (or their mixtures) are capable of forming stable lyotropic LC phases.

The organic compound forms a colloidal system (lyotropic LC phase) when dissolved in an appropriate solvent, in which the molecules are combined into supramolecular complexes representing kinetic units of the system. This lyotropic LC phase is an ordered precursor state of the system, from which an anisotropic thin crystal film is formed upon orientation of the supramolecular complexes and removal of the solvent.

The method for obtaining the thin crystal film from a colloidal system featuring supramolecular complexes comprises the following steps:

(i) applying the colloidal system onto a substrate; the colloidal system must be thixotropic, which implies that it occurs at a preset temperature and possesses a definite concentration;

(ii) converting the colloidal system prior to or during its application into a high flow state by any external action (heating, shear straining, etc.), which decreases the viscosity of the system; this external action can either be applied during the entire subsequent alignment stage or last for a minimum necessary time, so that the system does not relax into a state with increased viscosity during the alignment;

(iii) externally aligning the system (orienting the system), which can be produced either mechanically or by any other known technique; the degree of this external action should be sufficient to impart necessary alignment to kinetic units of the colloidal system and form a structure which would serve as a base of the future crystal lattice of the layer;

(iv) converting the oriented region of the layer from the state of reduced viscosity, which is achieved by the initial external alignment, into a state of the initial or higher viscosity; this transition is performed so as not to cause disorientation of the existing structure and not to produce defects on the layer surface;

(v) drying stage to remove solvent, in the course of which the required crystal structure is formed; and (vi) converting the crystalline film into a water-insoluble form by treating the surface with a solution containing ions of divalent or trivalent metals.

In the resulting crystalline film, the planes of molecules are parallel to each other and the molecules form, at least in a part of the layer, a three-dimensional crystal. Optimization of the production technology may allow a single crystal layer to be obtained. The optical axis of the thin crystal film is perpendicular to the planes of molecules. Such crystalline layers are highly anisotropic and exhibit a high refractive index in at least one direction.

In order to obtain the crystalline layers possessing required optical characteristics, it is possible to mix the colloidal systems, whereby joint supramolecular complexes will be formed in solution. The absorption and refraction indices of the layers obtained from mixed colloidal solutions can acquire various values within certain limits determined by the properties of initial components. The possibility of mixing various colloidal systems with the formation of joint supramolecular complexes is provided by the coincidence of one molecular dimension (3.4 Å in the aforementioned organic compounds). While occurring in the aqueous layer, the molecules possess a long-range order due to orientation of the supramolecular complexes at the substrate. Upon evaporation of the solvent, it is energetically favorable for the molecules to form a three-dimensional crystal.

The thickness of the final crystalline layer is determined by the content of solid substance in the aqueous solution and by the thickness of the aqueous layer applied onto the substrate. During the formation of such layers, a technological parameter conveniently controlled under commercial production conditions is offered by the solution concentration. The degree of crystallinity of the final layer can be monitored by X-ray diffraction or optical methods.

A distinctive feature of these thin crystal films is the high thermal stability, which is especially important for the modern LCD production technology.

The protective layer, for example, of acrylic or polyurethane, is provided to prevent any damage of the anisotropic layer by external factors in the course of the technological process, in particular, during etching of the ITO layer, and for insulating the anisotropic layer from the contact with electrodes and LC during the LCD operation. The silicon dioxide layer, which is applied between the conductive layer and the protective layer, can be formed by various well-known methods, including deposition upon evaporation in vacuum, cathode sputtering, "wet" deposition from solutions, etc. The protective layer may also contain heavy metal oxides. For example, a CERAMATE composition for the formation of protective layers from solution contains up to 6% of a sold phase (including $TiO_2$, $ZrO_2$, $SiO_2$, $Sb_2O_5$). The layers deposited from solutions are usually subject to sintering at elevated temperatures. In the production of multilayer plates, this operation is possible due to a high thermal stability of the anisotropic layer, which can withstand heating up to 180° C. or a short-time heating up to 250° C. and even above, without significant changes in the optical characteristics.

The protective layer can also be made of various polymers possessing thermal and chemical stability. The thermal stability of all layers in the multilayer plate is necessary because some technological operations involved in the LCD production (for example, the formation of leveling and alignment polyimide layers over the electrode system) includes heating to elevated temperatures.

The protective layer can also be formed from a material which has a good adhesion to the conductive layer, in which case an additional intermediate layer such as a silicon dioxide layer is not required as described above.

The conducting (ITO) layer can be formed by any known methods.

It is desired that the substrate are made of a polymer or glass material transparent in the visible range and cutting off the UV radiation component. This can be, for example, a colorless soda-lime glass with additives of selenium oxide (0.1-1.0%) iron oxide (about 0.07%), cobalt oxide (0.000001-0.001%), and selenium (up to 0.08%). These materials absorb the UV radiation of any polarization.

Along with the special UV protective optically transparent substrate, the protection against UV radiation can also be provided by an additional layer, for example, of 4-alkoxy-2-hydroxyphenyl-s-triazine type, incorporated into a cellulose triacetate film. In this case, the substrate can be made of a usual soda-lime glass or a plastic. The UV-cutoff layer can be applied either between any of the functional layers of the multilayer plate or outside the plate. The outer surface of the multilayer plate can also be coated with a lacquer containing necessary additives and absorbing the UV radiation.

The reflective and transflective designs of the multilayer plates comprise a reflector of any conventional specular or diffusive reflector, for example, manufactured of Al or Ag or Au. The reflective layer can be applied on the substrate or the reflector itself can serve as a substrate. A planarization layer should be applied on the top of the reflective layer. This planarization layer functions as a sublayer for the thin crystal film. In other embodiments, the surface of the reflector can be planarized in such a way that no additional layer is needed, and the thin crystal film is applied directly on the reflector.

The multilayer plate may also contain additional external layers protecting the system from mechanical damage during transportation, which are removed prior to the LCD fabrication.

The multilayer plates containing all the main functional LCD layers represent blanks for the fabrication of LCD panels. This simplifies the technology by reducing the number of technological operations involved in the LCD assembly process.

The dimensions of multilayer plates are determined by requirements of the LCD manufacturers. Generally, each wafer accommodates several LCD panels. Each panel is provided with a corresponding electrode system and etched paths at which the desired LCD panel configuration will be glued. The conducting material can be removed from the necessary areas of the plate by photolithographic techniques, laser ablation, etc.

The density and thickness of the protective layer should be sufficiently large to ensure that photolithography and other etching techniques do not damage the anisotropic thin crystal film.

In the case of using laser ablation for the formation of paths for gluing LCD sells, etching of the conducting layer can be performed simultaneously with sintering of the glass plate with the protective silicon dioxide layer.

The electrode system is usually covered with a polyimide layer that functions as a leveling (planarization) and LC alignment layer. The leveling can also be provided by deposition of some other materials, in particular, silicon dioxide. In this case, the leveling layer produces additional insulation preventing the interelectrode from breakdown.

After forming a desired array of the front and rear LCD panels, the plates are glued and the cells are filled with an LC solution. Then the individual LCDs are separated. The obtained LCDs contain internal polarizers, which simplifies the design, reduces the total device thickness, and increases reliability of the LCD operation.

In one embodiment shown in FIG. 1, the multilayer plate comprises an optically transparent substrate 1 made of a soda-lime glass, protective layer 2 absorbing UV radiation, polarizer 3 (representing a thin crystal film which is 300 to 800 nm thick and formed from a 9.5% aqueous solution of sulfided indanthrone), protective silicon dioxide layer 4, and conducting layer 5 (usually ITO). During transportation, such plates are protected from both sides with polymer films 6.

The protective layer can include a few separate layers of different materials such as $SiO_2$ and polyimide.

The multilayer plates containing all the main functional LCD layers represent blanks for the fabrication of LCD panels.

Figure 2:
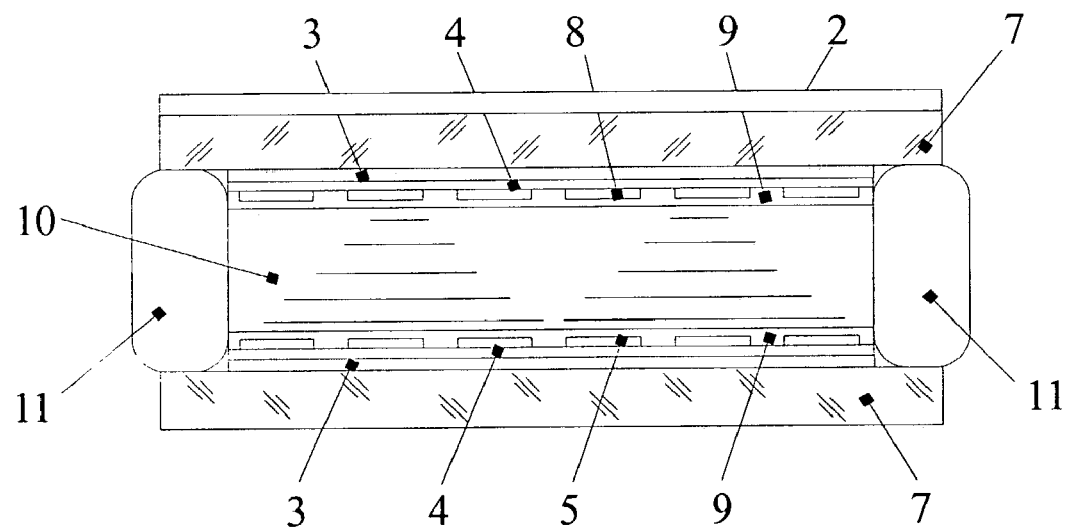
FIG. 2 is a schematic of an LCD with internal polarizers in accordance with one embodiment of the invention.

FIG. 2 presents one of the possible designs of LCD with internal polarizers. The device comprises a flat cell assembled from two plane-parallel glass plates 7, the inner surfaces of which bear sequentially deposited polarizer 3, protective silicon dioxide layer 4, electrode system 8 of an optically transparent conducting material (ITO), and alignment polyimide layer 9. One of the external glass plate surfaces bears layer 2 protecting the system from UV radiation. After assembly, the cell is filled with a liquid crystal 10 and hermetized with sealant 11.

Figure 3:
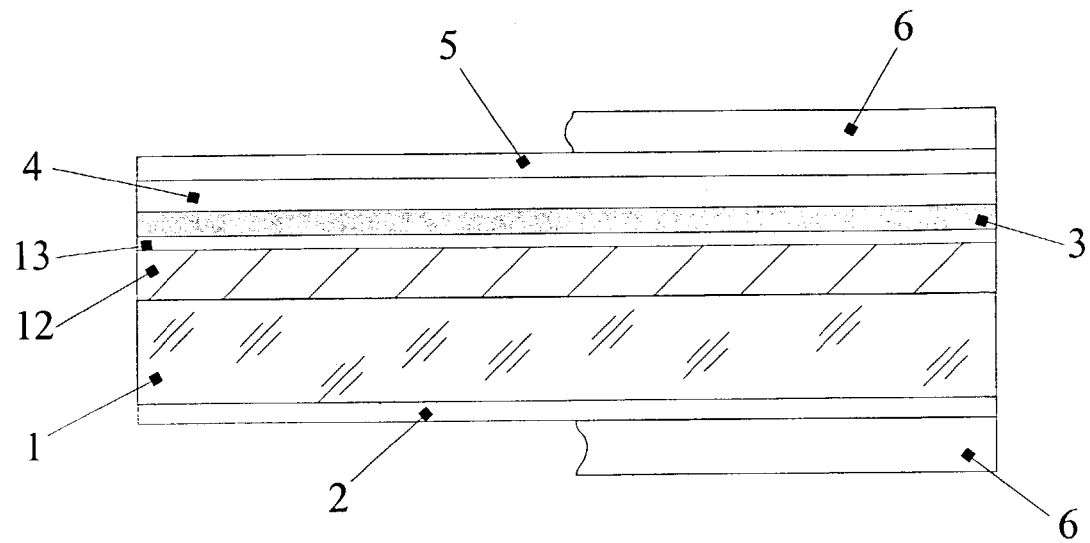
FIGS. 3 and 4 are schematics of a reflective or transflective multilayer plates with a reflector in different positions in accordance with one embodiment of the invention.

FIG. 3 presents another embodiment of the invention—the design of the multilayer plate used in a reflective or transflective LCD. The plate comprises an optically transparent substrate 1 which is usually a two-plane parallel lime glass plate with or without UV protective additives. In case of the reflective liquid crystal displays, the use of the UV protective additives in the glass or UV protective layer 2 on the external side of the glass plate is optional. On the inner surface of the glass there are sequentially deposited mirror 12, planarization layer 13, polarizer 3, and protective layer 4. The protective layer 4 can be made of polyimide or acrylic or silicon dioxide. The mirror can be reflective or transflective (the latter is used in the transflective LCD). It can be made of Al, Ag, Au, and can be specular or diffusive. For transportation, the plates are protected from both sides by polymer films 6.

Figure 4:
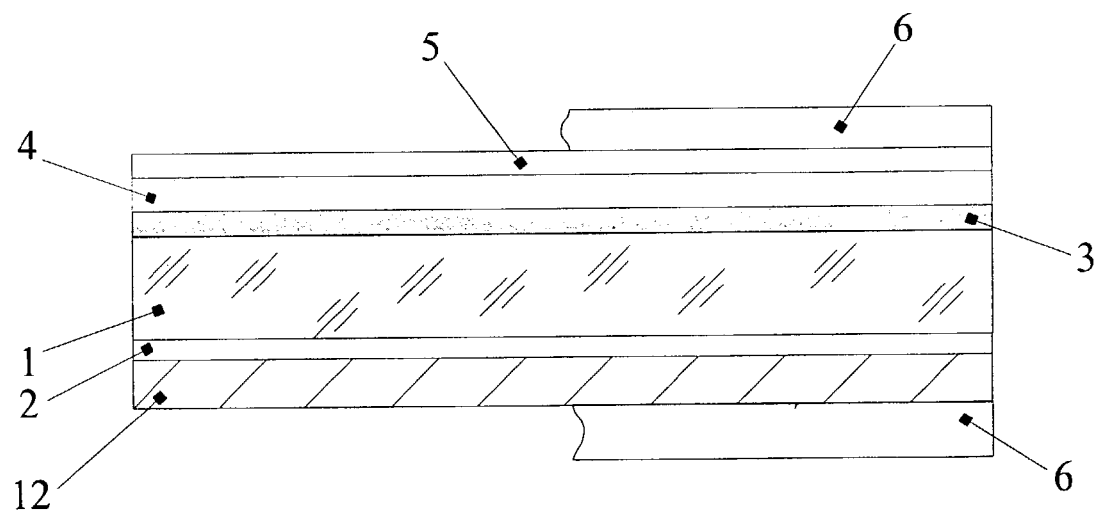

FIG. 4 presents another embodiment of the invention. As compared to the embodiment of FIG. 3, the difference is that a reflecting coating is applied on the rare side of the multilayer plate (with all other layers on the top, including the thin crystal film) and there is no planarization layer.

Figure 5:
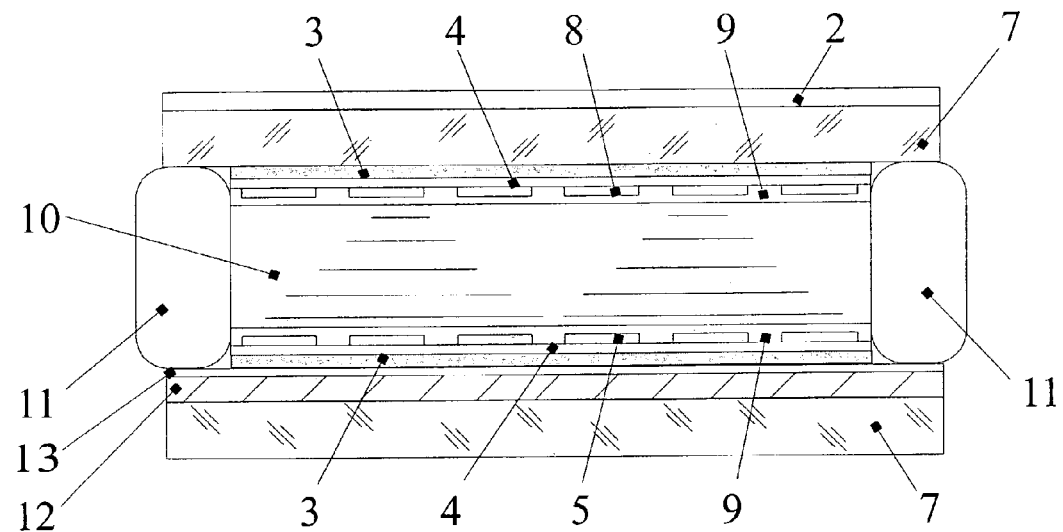
FIG. 5 is a schematic of a reflective or transflective LCD with internal polarizers in accordance with one embodiment of the invention.

FIG. 5 presents another embodiment of a reflective or transflective LCD with internal polarizers. The device comprises a flat cell assembled from a reflective or transflective multilayer plate presented in FIG. 3 and a transparent multilayer plate as presented in FIG. 1. After assembling, the cell is filled with a liquid crystal 10 and hermetized with a sealant 11. In the present embodiment, the top multilayer plate has a UV protective layer 2 among other layers, and the bottom multilayer plate is chosen without a UV protective layer.

Figure 6:
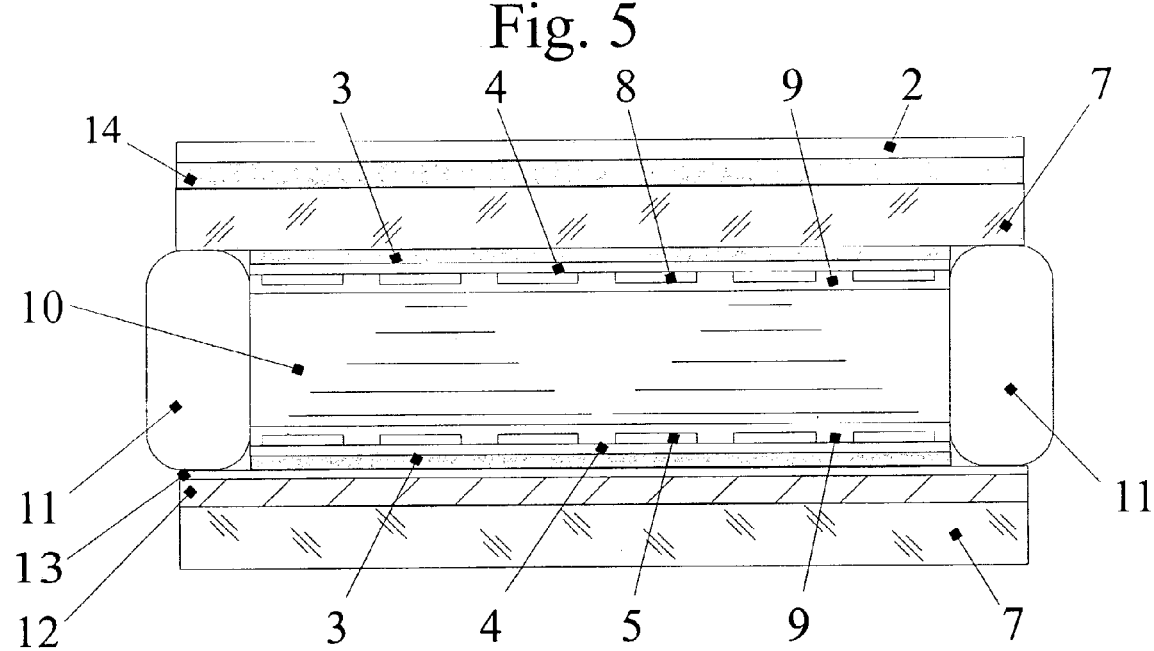
FIG. 6 is a schematic of a transflective LCD with internal polarizers and an additional polarizer on the back of the glass plate in accordance with one embodiment of the invention.

FIG. 6 presents another embodiment of a transflective LCD with internal polarizers. The device comprises a flat cell assembled from a transflective multilayer plate presented in FIG. 3 and a transparent multilayer plate as presented in FIG. 1. After assembling, the cell is filled with a liquid crystal 10 and hermetized with a sealant 11. As compared with the design, in FIG. 5, the difference is that an additional polarizer 14 is attached to the back of the glass plate. It can be a conventional polarizer or thin crystal film polarizer. This additional polarizer for the transflective design is used in order to enhance polarization characteristics. The polarization axes for polarizer 3 and polarizer 14 should be the same.

The LCD design with internal polarizers reduces the total device thickness and increases reliability of the LCD operation. Moreover, the optical properties of thin crystal films employed as anisotropic layers in such LCDs favor the creation of devices with high contrast and wide viewing angle.

The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A multilayer plate comprising an optically transparent substrate, a protective layer, a conducting layer, and at least one anisotropic thin crystal film made of a substance containing aromatic rings and possessing a structure with an interplanar spacing of 3.4±0.2Å, along with one of optical axes, wherein the at least one crystal film is situated between the substrate and the conducting layer and is separated from the conducting layer by the protective layer, and the substrate is made of a polymer or glass material transparent in the visible range and cutting off the UV radiation component, so that transmitting of the multilayer plate for UV radiation does not exceed 1% at any wavelength below 380 nm wherein the thin crystal film is a polarizer of the E type that simultaneously performs the functions of a polarizer and a phase-shifting layer; and wherein at least a part of the protective layer is conducting.

2. The multilayer plate according to claim 1, wherein the substance of the crystal film contains heterocycles.

3. The multilayer plate according to claim 2, wherein the heterocycles are oriented so that their planes are perpendicular to the substrate plane.

4. The multilayer plate according to claim 1, wherein the substrate is made of a material absorbing UV radiation.

5. The multilayer plate according to claim 1, wherein the substrate is made of a colorless soda-lime glass.

6. The multilayer plate according to claim 5, wherein the colorless soda-lime glass contains additives of selenium oxide, iron oxide, cobalt oxide, and selenium.

7. The multilayer plate according to claim 5, wherein the colorless soda-lime glass contains additives of selenium oxide (0.1-10%), iron oxide (about 0.07%), cobalt oxide (0.000001-0.001%), and selenium (up to 0.08%).

8. The multilayer plate according to claim 1, wherein the substrate is made of a plastic.

9. The multilayer plate according to claim 1, further containing an additional reflecting layer.

10. The multilayer plate according to claim 9, wherein the reflecting layer is specular or diffusive.

11. The multilayer plate according to claim 10, wherein the reflecting layer is applied on the rear side of the substrate.

12. The multilayer plate according to claim 10, wherein the reflecting layer is applied on the front side of the substrate and there is a planarization layer between the reflecting layer and the thin crystal film.

13. The multilayer plate according to claim 1, further comprising transflecting layer.

14. The multilayer plate according to claim 13, wherein the transflecting layer is specular or diffusive.

15. The multilayer plate according to claim 14, wherein the transflecting layer is applied on the rear side of the substrate.

16. The multilayer plate according to claim 14, wherein the transflecting layer is applied on the front side of the substrate and there is a planarization layer between the transflecting layer and the thin crystal film.

17. The multilayer plate according to claim 1, wherein the protective layer is made of silicon dioxide and/or at least one heavy metal oxide or a polymer.

18. The multilayer plate according to claim 1, further comprising a layer absorbing UV radiation.

19. The multilayer plate according to claim 18, wherein the transmission in the visible spectral range is not less than 80%.

20. The multilayer plate according to claim 18, wherein the layer absorbing UV radiation comprises 4-alkoxy-2-hydroxyphenyl-s-triazin incorporated in a cellulose triacetate film.

21. The multilayer plate according to claim 18, wherein the layer absorbing UV radiation is applied either between any of the function layers.

22. The multilayer plate according to claim 18, wherein the layer absorbing UV radiation is applied outside the multilayer plate.

23. The multilayer plate according to claim 22, wherein the layer absorbing UV radiation is prepared to coat with a lacquer containing necessary additives and absorbing the UV radiation.

24. The multilayer plate according to claim 1, wherein the conducting layer is made of ITO.

25. The multilayer plate according to claim 24, wherein a metal grid is applied onto the conducting layer.

26. The multilayer plate according to claim 25, wherein the total area of the metal grid amounts to less than 10% of the total area of the multilayer plate.

27. The multilayer plate according to claim 1, wherein refractive indices of each layer in at least one spectral region, thicknesses of these layers, and their combination are selected so that the multilayer plate provides an interference extremum for at least one polarization of light in this spectral region.

28. The multilayer plate according to claim 1, further comprising at least one polymer coating.

29. A display panel comprising an optically transparent substrate, a protective layer, a system of electrodes, a transflecting layer, and at least one anisotropic thin crystal film made of a substance containing aromatic rings and possessing a structure with an interplanar spacing of 3.4±0.2Å along one of optical axes,
- wherein the at least one thin crystal film is situated between the substrate and the system of electrodes and is separated from the system of electrodes by the protective layer, and the substrate is made of a polymer or glass material transparent in the visible range and cutting off the UV radiation component, so that transmission of the multilayer plate for UV radiation does not exceed 1% at any wavelength below 380 nm wherein the thin crystal film is a polarizer of the E type that simultaneously performs the functions of a polarizer and a phase-shifting layer; and
- wherein at least a part of the protective layer is conducting.

30. The display panel according to claim 29, wherein the substance of the thin crystal film contains heterocycles.

31. The display panel according to claim 30, wherein the heterocycles are oriented so that their planes are perpendicular to the substrate plane.

32. The display panel according to claim 29, wherein the substrate is made of a material absorbing UV radiation.

33. The display panel according to claim 29, wherein the substrate is made of a colorless soda-lime glass.

34. The display panel to claim 33, wherein the colorless soda-lime glass contains additives of selenium oxide, iron oxide, cobalt oxide, and selenium.

35. The display panel according to claim 33, wherein the colorless soda-lime glass contains additives of selenium oxide (0.1-10%), iron oxide (about 0.07%), cobalt oxide (0.000001-0.001%), and selenium (up to 0.08%).

36. The display panel according to claim 29, wherein the substrate is made of a plastic.

37. The display panel according to claim 29, further comprising a reflecting layer.

38. The display panel according to claim 37, wherein the reflecting layer is specular or diffusive.

39. The display panel according to claim 38, wherein the reflecting layer is applied on the rear side of the substrate.

40. The display panel according to claim 38, wherein the reflecting layer is applied on the front side of the substrate and there is a planarization layer between the reflecting layer and the thin crystal film.

41. The display panel according to claim 29, further comprising a layer absorbing UV radiation.

42. The display panel according to claim 41, wherein the transmission in the visible spectral range is not less than 80%.

43. The multi plate according to claim 41, wherein the layer absorbing UV radiation comprises 4-alkoxy-2-hydroxyphenyl-s-triazin incorporated in a cellulose triacetate film.

44. The multilayer plate according to claim 41, wherein the layer absorbing UV radiation is applied between any of the function layers.

45. The multilayer plate according to claim 41, wherein the layer absorbing UV radiation is applied outside the multilayer plate.

46. The multilayer plate according to claim 45, wherein the layer absorbing UV radiation is prepared to coat with a lacquer containing necessary additives and absorbing the UV radiation.

47. The display panel according to claim 29, wherein the protective layer is made of silicon dioxide and/or at least one heavy metal oxide or a polymer.

48. The display panel according to claim 29, wherein the electrode system is made of ITO.

49. The display panel according to claim 48, wherein a metal grid is applied onto the ITO layer.

50. The display panel according to claim 49, wherein the total area of the metal grid amounts to less than 10% of the total area of electrodes.

51. The display panel according to claim 29, wherein refractive indices of each layer in at least one spectral region, thicknesses of these layers, and their combination are selected so that the display panel provides an interference extremum for at least one polarization of light in this spectral region.

52. The display panel according to claim 29, further comprising an adhesive layers.

53. The display panel according to claim 29, further comprising an additional polarizer.

54. The display panel according to claim 53, wherein the additional polarizer is placed on the side of the substrate opposite to the thin crystal film.

55. The display panel according to claim 29, further comprising a transflecting layer.

56. The display panel according to claim 55, wherein the transflecting layer is specular or diffusive.

57. The display panel according to claim 55, wherein the transflecting layer is applied on the rear side of the substrate.

58. The display panel according to claim 55, wherein the transflecting layer is applied on the front side of the substrate and there is a planarization layer between the transflecting layer and the thin crystal film.

59. A multilayer plate comprising an optically transparent substrate, a protective layer, a conducting layer, and at least one anisotropic thin crystal film made of a substance containing aromatic rings and possessing a structure with an interplanar spacing of 3.4±0.2Å along one of optical axes,
wherein the at least one crystal film is situated between the substrate and the conducting layer and is separated from the conducting layer by the protective layer,
and further comprises a layer absorbing UV radiation,
so that transmission of the multilayer plate for UV radiation dose not exceed 1% at any wavelength below 380 nm wherein the thin crystal film is a polarizer of the E type that simultaneously performs the functions of a polarizer and a phase-shifting layer; and
wherein at least a part of the protective layer is conducting.

60. The multi plate according to claim 59, wherein the layer absorbing UV radiation comprises 4-alkoxy-2-hydroxyphenyl-s-triazin incorporated in a cellulose triacetate film.

61. The multilayer plate according to claim 59, wherein the layer absorbing UV radiation is applied either between any of the function layers.

62. The multilayer plate according to claim 59, wherein the layer absorbing UV radiation is applied outside the multilayer plate.

63. The multilayer plate according to claim 59, wherein the layer absorbing UV radiation is prepared to coat with a lacquer containing necessary additives and absorbing the UV radiation.

64. The multilayer plate according to claim 59, wherein the substance of the crystal film contains heterocycles.

65. The multilayer plate according to claim 64, wherein the heterocycles are oriented so that their planes are perpendicular to the substrate plane.

66. The multilayer plate according to claim 59, wherein the substrate is made of a material absorbing UV radiation.

67. The multilayer plate according to claim 59, wherein the substrate is made of a glass.

68. The multilayer plate according to claim 59, wherein the substrate is made of a colorless soda-lime glass.

69. The multilayer plate according to claim 68, wherein the colorless soda-lime glass contains additives of selenium oxide, iron oxide, cobalt oxide, and selenium.

70. The multilayer plate according to claim 68, wherein the colorless soda-lime glass contains additives of selenium oxide (0.1-10%), iron oxide (about 0.07%), cobalt oxide (0.000001-0.001%), and selenium (up to 0.08%).

71. The multilayer plate according to claim 59, wherein the substrate is made of a plastic.

72. The multilayer plate according to claim 59, further comprising transflecting layer.

73. The multilayer plate according to claim 72, wherein the transflecting layer is specular or diffusive.

74. The multilayer plate according to claim 72, wherein the transflecting layer is applied on the rear side of the substrate.

75. The multilayer plate according to claim 72, wherein the transflecting layer is applied on the front side of the substrate and there is a planarization layer between the transflecting layer and the thin crystal film.

76. The multilayer plate according to claim 59, wherein the protective layer is made of silicon dioxide and/or at least one heavy metal oxide or a polymer.

77. The multilayer plate according to claim 59, wherein the transmission in the visible spectral range is not less than 80%.

78. The multilayer plate according to claim 59, wherein the conducting layer is made of ITO.

79. The multilayer plate according to claim 78, wherein a metal grid is applied onto the conducting layer.

80. The multilayer plate according to claim 79, wherein the total area of the metal grid amounts to less than 10% of the total area of the multilayer plate.

81. The multilayer plate according to claim 59, wherein refractive indices of each layer in at least one spectral region, thicknesses of these layers, and their combination are selected so that the multilayer plate provides an interference extremum for at least one polarization of light in this spectral region.

82. The multilayer plate according to claim 59, further comprising at least one polymer coating.

83. A display panel comprising an optically transparent substrate, a protective layer, a system of electrodes, and at least one anisotropic thin crystal film made of a substance containing aromatic rings and possessing a structure with an interplanar spacing of 3.4±0.2Å along one of optical axes,
wherein the at least one thin crystal film is situated between the substrate and the system of electrodes and is separated from the system of electrodes by the protective layer,
and further comprises a layer absorbing UV radiation,
so that transmission of the multilayer plate for UV radiation does not exceed 1% at any wavelength below 380 nm wherein the thin crystal film is a polarizer of the E type that simultaneously performs the functions of a polarizer and a phase-shifting layer; and
wherein at least a part of the protective layer is conducting.

84. The display panel according to claim 83, wherein the substance of the thin crystal film contains heterocycles.

85. The display panel according to claim 84, wherein the heterocycles are oriented so that their planes are perpendicular to the substrate plane.

86. The display panel according to claim 83, wherein the substrate is made of a material absorbing UV radiation.

87. The display panel according to claim 83, wherein the substrate is made of a glass.

88. The display panel according to claim 83, wherein the substrate is made of a colorless soda-lime glass.

89. The display panel according to claim 88, wherein the colorless soda-lime glass contains additives of selenium oxide, iron oxide, cobalt oxide, and selenium.

90. The display panel according to claim 88, wherein the colorless soda-lime glass contains additives of selenium oxide (0.1-10%), iron oxide (about 0.07%), cobalt oxide (0.000001-0.001%), and selenium (up to 0.08%).

91. The display panel according to claim 83, wherein the substrate is made of a plastic.

92. The display panel according to claim 83, further comprising a transflecting layer.

93. The display panel according to claim 92, wherein the transflecting layer is specular or diffusive.

94. The display panel according to claim 92, wherein the transflecting layer is applied on the rear side of the substrate.

95. The display panel according to claim 92, wherein the transflecting layer is applied on the front side of the substrate and there is a planarization layer between the transflecting layer and the thin crystal film.

96. The display panel according to claim 95, wherein the transmission in the visible spectral range is not less than 80%.

97. The display panel according to claim 83, wherein the protective layer is made of silicon dioxide and/or at least one heavy metal oxide or a polymer.

98. The display panel according to claim 83, wherein the electrode system is made of ITO.

99. The display panel according to claim 98, wherein a metal grid is applied onto the ITO layer.

100. The display panel according to claim 99, wherein the total area of the metal grid amounts to less than 10% of the total area of electrodes.

101. The display panel according to claim 83, wherein refractive indices of each layer in at least one spectral region, thicknesses of these layers, and their combination are selected so that the display panel provides an interference extremum for at least one polarization of light in this spectral region.

102. The display panel according to claim 83, further comprising an adhesive layers.

103. The display panel according to claim 83, further comprising an additional polarizer.

104. The display panel according to claim 103, wherein the additional polarizer is placed on the side of the substrate opposite to the thin crystal film.

* * * * *